(12) United States Patent
Eva (10) Patent No.: US 11,635,056 B2
(45) Date of Patent: Apr. 25, 2023

(54) ELECTRIC GENERATING PRECIPITATION COLLECTION SYSTEM

(71) Applicant: Leonard Eva, Calgary (CA)

(72) Inventor: Leonard Eva, Calgary (CA)

( * ) Notice: Subject to any disclaimer, the term of this patent is extended or adjusted under 35 U.S.C. 154(b) by 0 days.

(21) Appl. No.: 17/892,945

(22) Filed: Aug. 22, 2022

(65) Prior Publication Data
US 2023/0055645 A1 Feb. 23, 2023

Related U.S. Application Data

(60) Provisional application No. 63/235,998, filed on Aug. 23, 2021.

(51) Int. Cl.
| | | |
|---|---|---|
| *F03B 17/02* | (2006.01) | |
| *F03D 9/00* | (2016.01) | |
| *F03B 9/00* | (2006.01) | |
| *F03B 11/00* | (2006.01) | |
| *F03B 7/00* | (2006.01) | |
| *F03B 17/00* | (2006.01) | |
| *F03B 13/06* | (2006.01) | |

(52) U.S. Cl.
CPC ............ *F03B 17/025* (2013.01); *F03B 7/006* (2013.01); *F03B 9/00* (2013.01); *F03B 9/005* (2013.01); *F03B 11/004* (2013.01); *F03B 13/06* (2013.01); *F03B 17/005* (2013.01); *F03D 9/007* (2013.01); *F03D 9/008* (2013.01); *F03B 7/003* (2013.01); *F05B 2220/703* (2020.08)

(58) Field of Classification Search
CPC .......... F03B 17/025; F03B 7/006; F03B 9/00; F03B 9/005; F03B 11/004; F03B 13/06; F03B 17/005; F03B 7/003; F03D 9/007; F03D 9/008; F05B 2220/703
See application file for complete search history.

(56) References Cited

U.S. PATENT DOCUMENTS

| | | | |
|---|---|---|---|
| 4,246,753 A | 1/1981 | Redmond | |
| 4,923,368 A | 5/1990 | Martin | |
| 8,534,057 B1 * | 9/2013 | Brown | .................. F03B 17/068 415/5 |
| 8,610,295 B1 | 12/2013 | Stevens | |
| 2009/0008940 A1 * | 1/2009 | Strain | ..................... F03B 13/06 290/52 |
| 2009/0095339 A1 | 4/2009 | Nightingale | |

(Continued)

FOREIGN PATENT DOCUMENTS

| | | |
|---|---|---|
| WO | WO2009048432 A2 | 4/2009 |
| WO | WO2018171341 A1 | 9/2018 |

*Primary Examiner* — Mickey H France (57) ABSTRACT

An electric generating precipitation collection system comprising a collection tank, a plurality of pipes, a plurality of valves, a piston assembly, and an outlet. The system is configured to collect a liquid, direct the liquid through the pipes and valves to pressurize the liquid with the piston assembly, and eject the pressurized liquid at the outlet. The plurality of pipes and valves are arranged relative to the piston assembly so that a piston can pressurize the liquid in the pipe connected to the outlet. The system may further comprise a generator that converts the force of the pressurized liquid from the outlet into electricity. Further, a collection basin may be included in the system to collect liquid after passing through the generator.

16 Claims, 12 Drawing Sheets

(56) References Cited

U.S. PATENT DOCUMENTS

| | | | |
|---|---|---|---|
| 2013/0341937 A1* | 12/2013 | Stevens | F03B 13/06 |
| | | | 290/1 R |
| 2017/0122284 A1* | 5/2017 | Mesinger | F03B 13/06 |
| 2017/0298631 A1 | 10/2017 | Valinejadshoubi | |
| 2018/0149131 A1* | 5/2018 | Alkhars | F03B 15/16 |

* cited by examiner

ELECTRIC GENERATING PRECIPITATION COLLECTION SYSTEM

FIELD OF THE INVENTION

The present invention relates generally to systems of generating electricity from precipitation and water flow. More specifically, the present invention is a system configured to attach to a building and direct water for electricity generation.

BACKGROUND OF THE INVENTION

In the modern day many buildings are either not equipped with or only have inadequate rainwater/precipitation systems. Most of the time much of this rainwater is used to for various uses outside of the building such as cleaning or watering of surrounding areas. Many systems are not capable of providing the building with a supply of rainwater/precipitation. Some of the modern-day systems are able to supply buildings with a system that gathers rainwater/precipitation however, they encounter several problems during the process. These systems only work when there is a constant supply of rainwater/precipitation and do not have a method of pumping the rainwater/precipitation though the system during dry seasons. Additionally, the rainwater/precipitation is not usually used within this type of system to generate electricity making the system self-sufficient. Furthermore, most systems only work with a specific design and cannot be expanded or reduced to work with a various number of tubes within the same system An objective of the present invention is to provide users with water recirculation system that can function all year long in a self-sufficient manner. The present invention intends to provide users with a device that collects rainwater/precipitation and stores it as a liquid to be pumped autonomously throughout a building with various setups. In order to accomplish that, a preferred configuration of the present invention comprises a series of phases for water movement. Further, each of these phases relates to a group of components that can be arranged in several ways to ensure the liquid circulation method is compatible with various sized and shaped buildings. Thus, the present invention is an electric generating system for precipitation that can be pumped autonomously throughout a building all year round in a self-sufficient manner.

SUMMARY OF THE INVENTION

The present invention is a water recirculation method within a building to help with autonomously pumping water within a system. The present invention seeks to provide users with a method that can collect rainwater/precipitation stored as a liquid that can be pumped throughout a building all year round with a self-sufficient power system. In order to accomplish this the present invention comprises a plurality of tanks, pipes, and valves to store and deliver liquid throughout the system. The precipitation collected by the system is ultimately pumped to a generator that generates electricity by capturing the energy of the high-pressure water from the pipes. The system is configured to recirculate water by collecting the water in a collection basin at the foot of the generator, where it can be pumped back to the source tank using supplemental electricity captured by solar, wind, or other power sources.

DETAIL DESCRIPTIONS OF THE INVENTION

All illustrations of the drawings are for the purpose of describing selected versions of the present invention and are not intended to limit the scope of the present invention.

The present invention is an electric generating precipitation collection system for a building. An objective of the present invention is to provide users with a system that can collect rainwater/precipitation stored as a liquid that can be pumped throughout a building all year round with a self-sufficient power system. The liquid recirculation system comprises a piston sub-system 100 and a generator 200. Generally, precipitation is collected at the top of the piston sub-system 100, the precipitation is directed through the piston sub-system 100 to build fluid pressure, and the precipitation is ejected to the generator 200 to produce electricity. The system of the present invention may additionally comprise a return fluid line 302, at least one pump, a collection basin 301, a temperature control mechanism 305, and a supplemental electricity source 306.

Referring to FIG. 1-4, the piston sub-system 100 of the present invention is configured to collect liquid, pressurize the liquid, and expel the liquid. Generally, the piston sub-system 100 comprises a collection tank 101, a plurality of pipes 115, a plurality of valves 116, a piston assembly 117, and an outlet 113. In the preferred embodiment, the plurality of pipes 115 further comprises a first pipe 102, a second pipe 103, and a third pipe 104. Further, the plurality of valves 116 comprises a first valve 105, a second valve 106, a third valve 107, and a fourth valve 108. Further, the piston assembly 117 comprises a piston 111, a counter-piston 112, a connection cable 114, a pulley mechanism 109, and a locking mechanism 110. The piston 111 may further comprise a head 118 and a rod 119.

The collection tank 101 sits at the top of the piston sub-system 100 with the first valve 105 and the second valve 106 attached to the collection tank 101. The first pipe 102 is attached to the collection tank 101 at the first valve 105 and the second pipe 103 is attached to the collection tank 101 at the second valve 106. The first valve 105 and the second valve 106 are configured to selectively allow liquid to pass from the collection tank 101 to the first pipe 102 and the second pipe 103 respectively. The piston assembly is integrated with the collection tank 101, the first pipe 102, and the second pipe 103. The piston 111 and the counter-piston 112 are connected by the connection cable 114 with the connection cable 114 connecting to the piston 111 at the head 118 of the piston 111. The connection cable 114 is adjustably engaged with the pulley mechanism 109. The locking mechanism 110 is connected to the pulley mechanism 109 and configured to selectively restrict movement of the connection cable 114 relative to the pulley mechanism 109. The piston 111 is arranged within the second pipe 103 with the head 118 oriented toward the collection tank 101 and is configured to move slidingly relative to the second pipe 103. The counter-piston 112 is preferably arranged within the first pipe 102 and is configured to slidingly move relative to the first pipe 102, though the counter-piston 112 may also be arranged outside the first pipe 102 in some embodiments. Through their attachment by the connection cable 114, the piston 111 configured to move when the counter-piston 112 moves, and the counter-piston 112 is configured to move when the piston 111 moves.

The third pipe 104 is connected to the second pipe 103, opposite the collection basin 301. The third pipe 104 is arranged to allow the rod 119 of the piston 111 to pass between the second pipe 103 and the third pipe 104. The third pipe 104 is also attached to the first pipe 102 by way of the third valve 107. The third valve 107 is configured to selectively allow liquid to pass between the first pipe 102 and the third pipe 104. The fourth valve 108 and the outlet 113 are each connected to the third pipe 104, opposite the second pipe 103. The fourth valve 108 is configured to selectively allow liquid to pass between the third pipe 104 and the outlet 113. The outlet 113 is configured to direct the liquid out of the piston sub-system 100 and toward the generator 200.

Referring to FIG. 5-9, the generator 200 is situated adjacent to the outlet 113 of the piston sub-system 100 and is configured to produce electricity from the flow of water out of the outlet 113. The generator 200 may be any energy generation mechanism that converts movement into electricity but is generally a turbine or similar mechanism. In the preferred embodiment, the generator 200 comprises a belt 201, a plurality of teeth 202, a sidewall 203, and an energy conversion mechanism 204. Each of the plurality of teeth 202 has an activating end 205 and a supporting end 206. The activating end 205 may be any shape for capturing the energy of incoming liquid, though the preferred shape of the activating end 205 two angled surfaces meeting at a curved edge. The plurality of teeth 202 is arranged on the belt 201 with the activating end 205 of each of the plurality of teeth 202 oriented in the same direction. The belt 201 is arranged in a loop below the outlet 113 of the piston sub-system 100 and configured to rotate when acted upon by an outside force. The belt 201 is further arranged so that the activating end 205 of each of the plurality of teeth 202 is oriented toward the outlet 113 when passing below the outlet 113. This orientation allows pressurized liquid passing out of the outlet 113 to act upon the activating end 205 of plurality of teeth 202, rotating the belt 201. The plurality of teeth 202 may be arranged in a single column along the belt 201 or may be arranged in rows along the length of the belt 201. In one embodiment, the each of the plurality of teeth 202 is arranged on the belt 201 such that any gap between teeth 202 in one row is covered by the teeth 202 in the following row. The plurality of teeth 202 may be arranged along the belt 201 in any manner. The sidewall 203 may be attached to the belt 201 to prevent liquid from straying from the belt 201 when passing through the generator 200. The energy conversion mechanism 204 is attached to the belt 201 and configured to convert the movement of the belt 201 into electricity.

Figure 10:
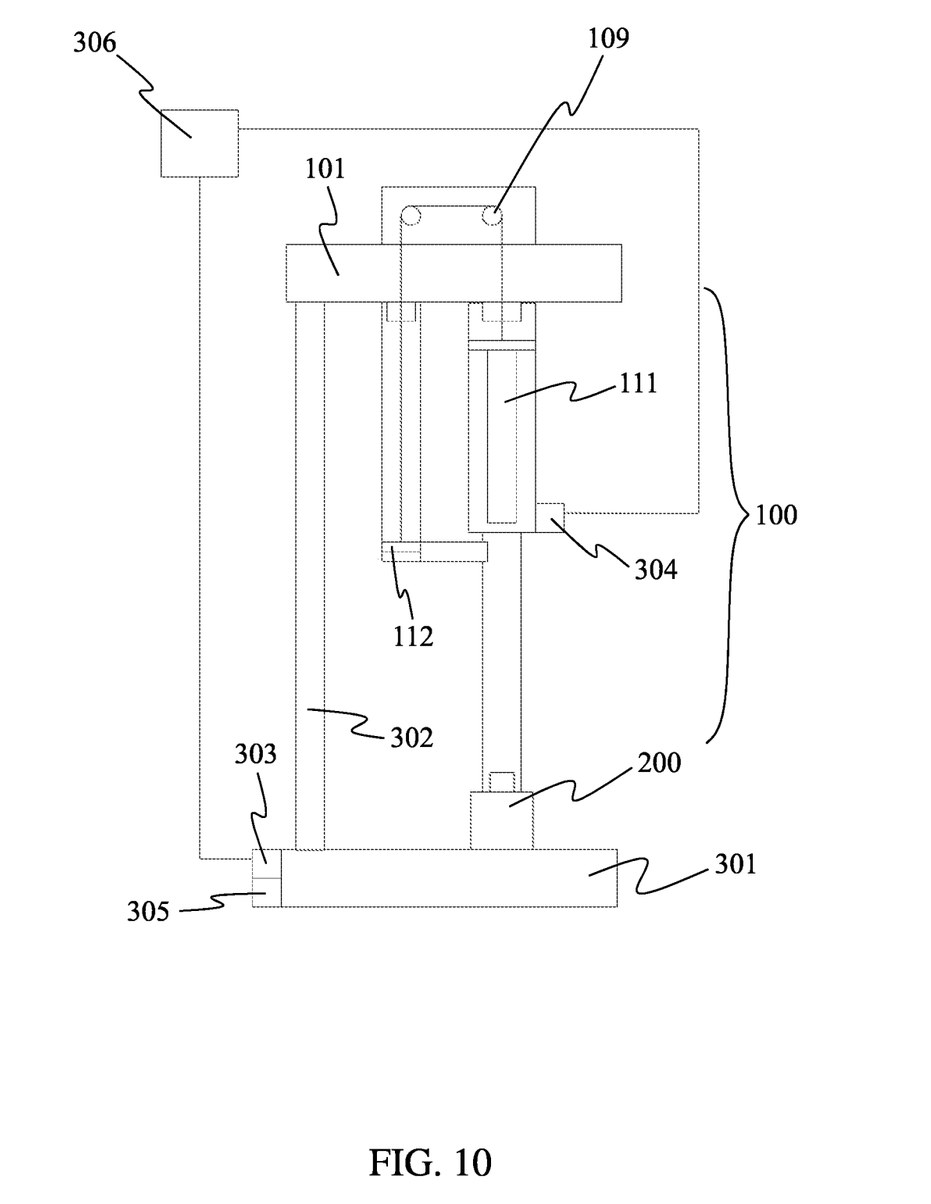
FIG. 10 is a diagram of the system of present invention in accordance with at least one embodiment.

Referring to FIG. 10, the collection basin 301 is arranged below the generator 200, opposite the piston sub-system 100 and is configured to collect liquid flowing out of the generator 200. The return fluid line 302 liquidly connects the collection basin 301 to the collection tank 101. The temperature control mechanism 305 is attached to the collection basin 301 and configured to adjust the temperature of the liquid in the collection basin 301. The at least one pump may comprise a first pump 303 and a second pump 304. The first pump 303 is configured to pump liquid from the collection basin 301 to the collection tank 101 through the return fluid line 302. The second pump 304 is configured to pump liquid from the second pipe 103 to the collection tank 101. The supplemental electricity source 306 may be connected to the temperature control mechanism 305 and the at least one pump. The supplemental electricity source 306 is generally a solar panel or wind turbine, though it may be any other means of supplying power such as a battery.

Figure 11:
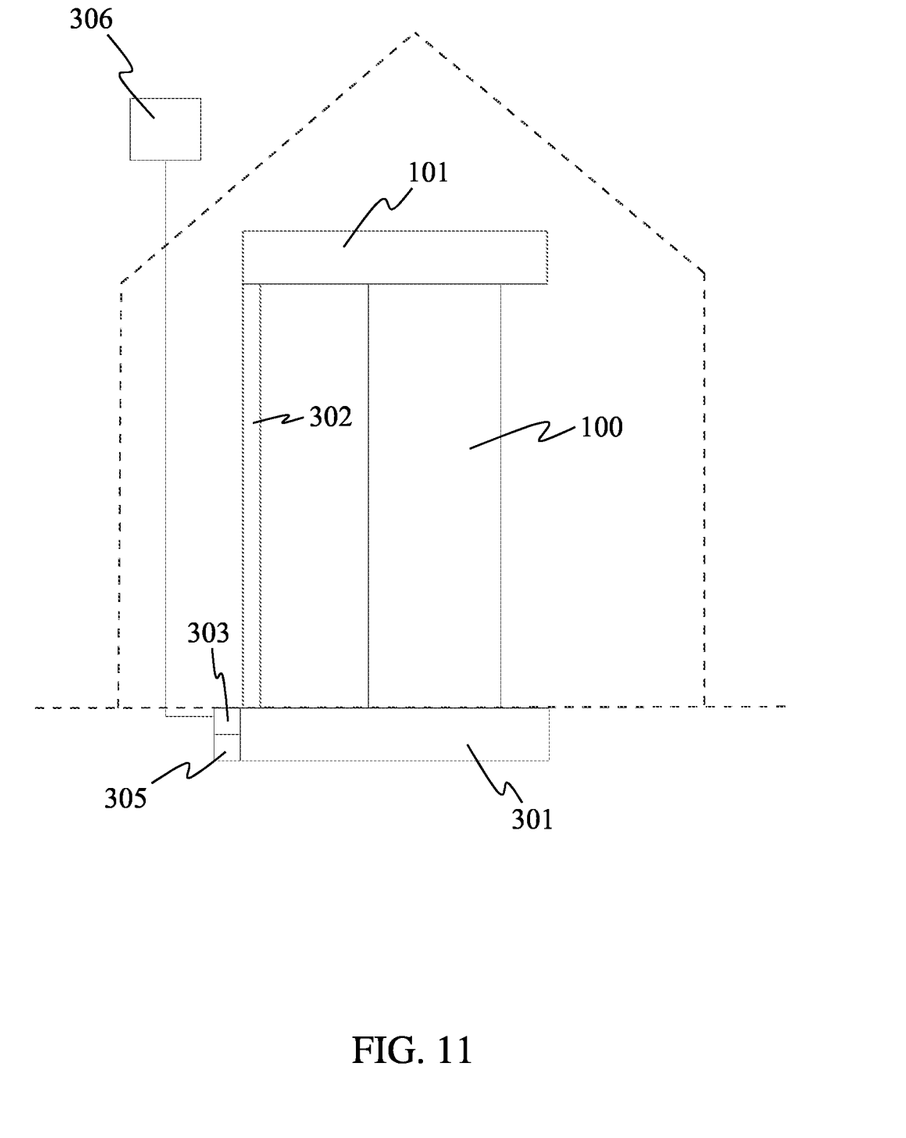
FIG. 11 is an illustration of the system of the present invention situated within a building.
Figure 12:
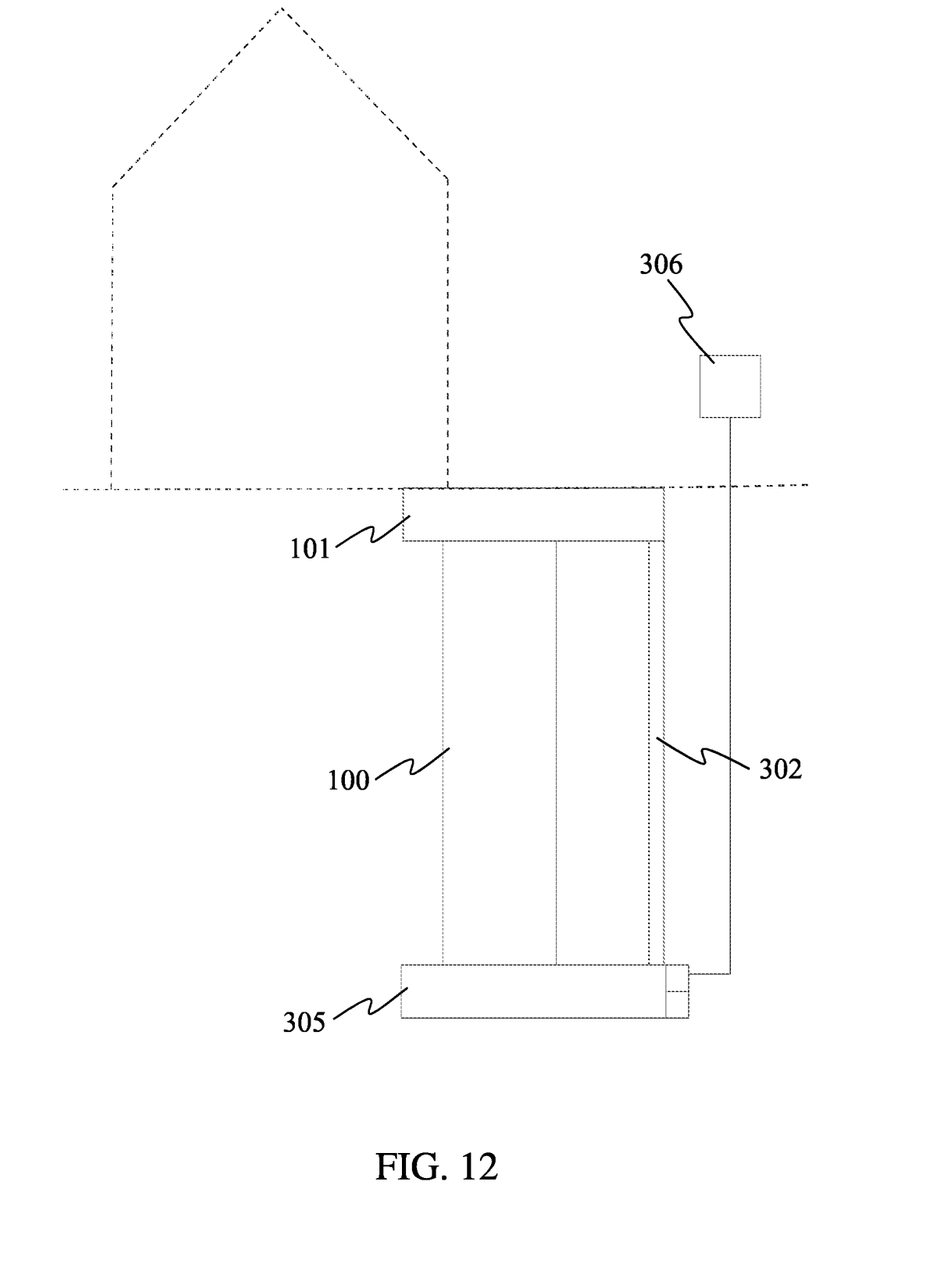
FIG. 12 is an illustration of the system of the present invention situated below a building.

As shown in FIG. 11-12, the present invention may be attached to a building in a variety of ways. In one embodiment, the present invention is attached to a building with the collection tank 101 near the roof of the house and the collection basin 301 near the ground. This configuration allows precipitation to be collected in the collection tank 101 from the roof of the house and directed through the system to the collection basin 301 at the ground before being pumped back to the roof of the house. In an alternative embodiment, the present invention is placed underground with the collection tank 101 and ground level and the collection basin 301 underground. This configuration allows precipitation to be collected in the collection tank 101 from the ground and directed through the system underground to the collection basin 301 before being pumped back to ground level.

In use, precipitation is collected in the collection tank 101. The first valve 105 may then be opened, allowing liquid to flow from the collection tank 101 into the first pipe 102. The liquid flowing into the first pipe 102 presses the counter-piston 112 through the first pipe 102, away from the collection tank 101, simultaneously raising the piston 111 in the second pipe 103, toward the collection tank 101. The first valve 105 may then be closed, and the third valve 107 may be opened, allowing the liquid from the first pipe 102 to flow into the third pipe 104 before closing the third valve 107. The second valve 106 may then be opened, allowing liquid to flow from the collection tank 101 into the second pipe 103. The second valve 106 may be closed once the desired amount of liquid enters the second pipe 103. As liquid enters the second pipe 103, it acts upon the head 118 of the piston 111, pressing the piston 111 away from the collection tank 101 and causing the rod 119 of the piston 111 to enter the third pipe 104, placing pressure on the liquid in the third pipe 104. The fourth valve 108 may then be opened, allowing the pressurized liquid from the third pipe 104 to pass to the outlet 113 and be ejected out of the outlet 113. The fourth valve 108 may then be closed. The locking mechanism 110 may be utilized at any point in the process to lock the positions of the piston 111 and counter-piston 112 as needed.

Figure 1:
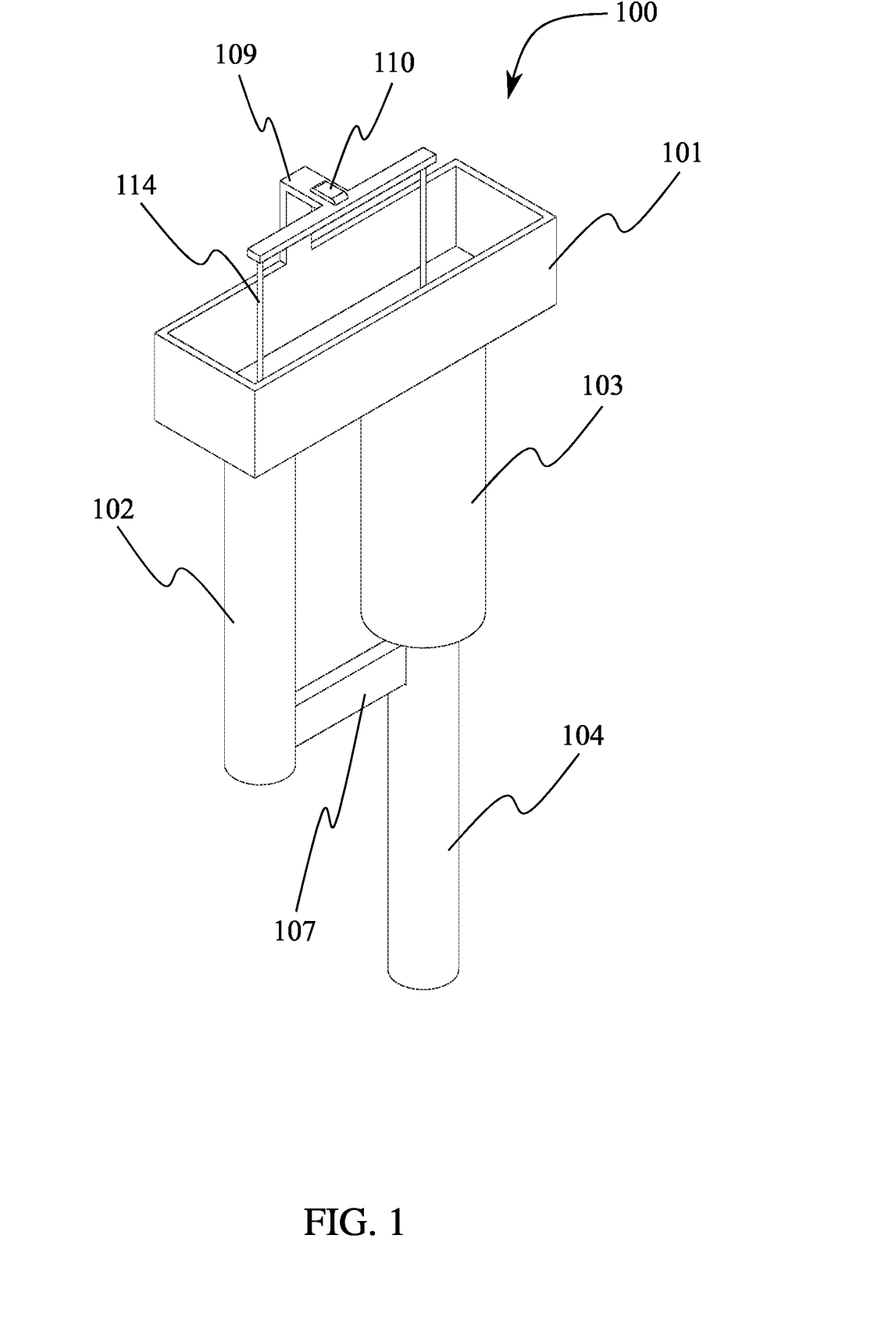
FIG. 1 is an isometric view of the piston subsystem of the present invention in accordance with at least one embodiment.
Figure 2:
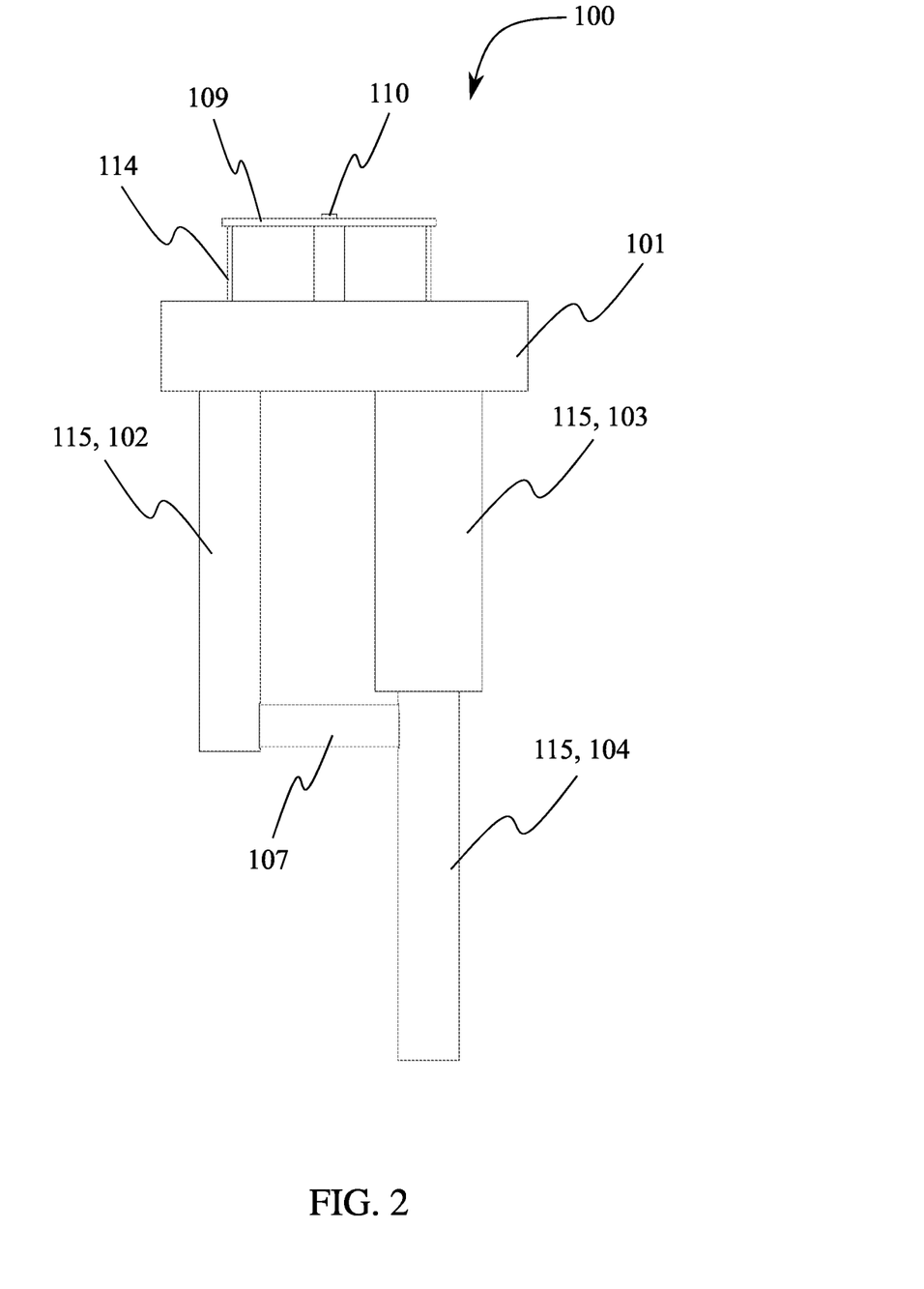
FIG. 2 is a front elevation view of the piston subsystem of the present invention in accordance with at least one embodiment.
Figure 3:
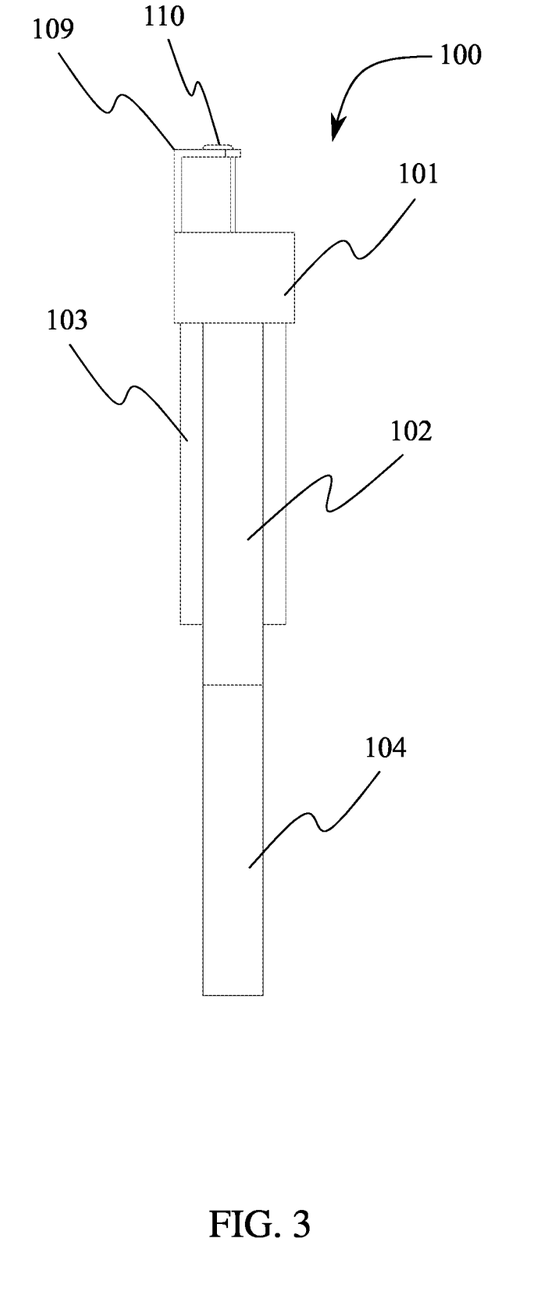
FIG. 3 is a side elevation view of the piston subsystem of the present invention in accordance with at least one embodiment.
Figure 4:
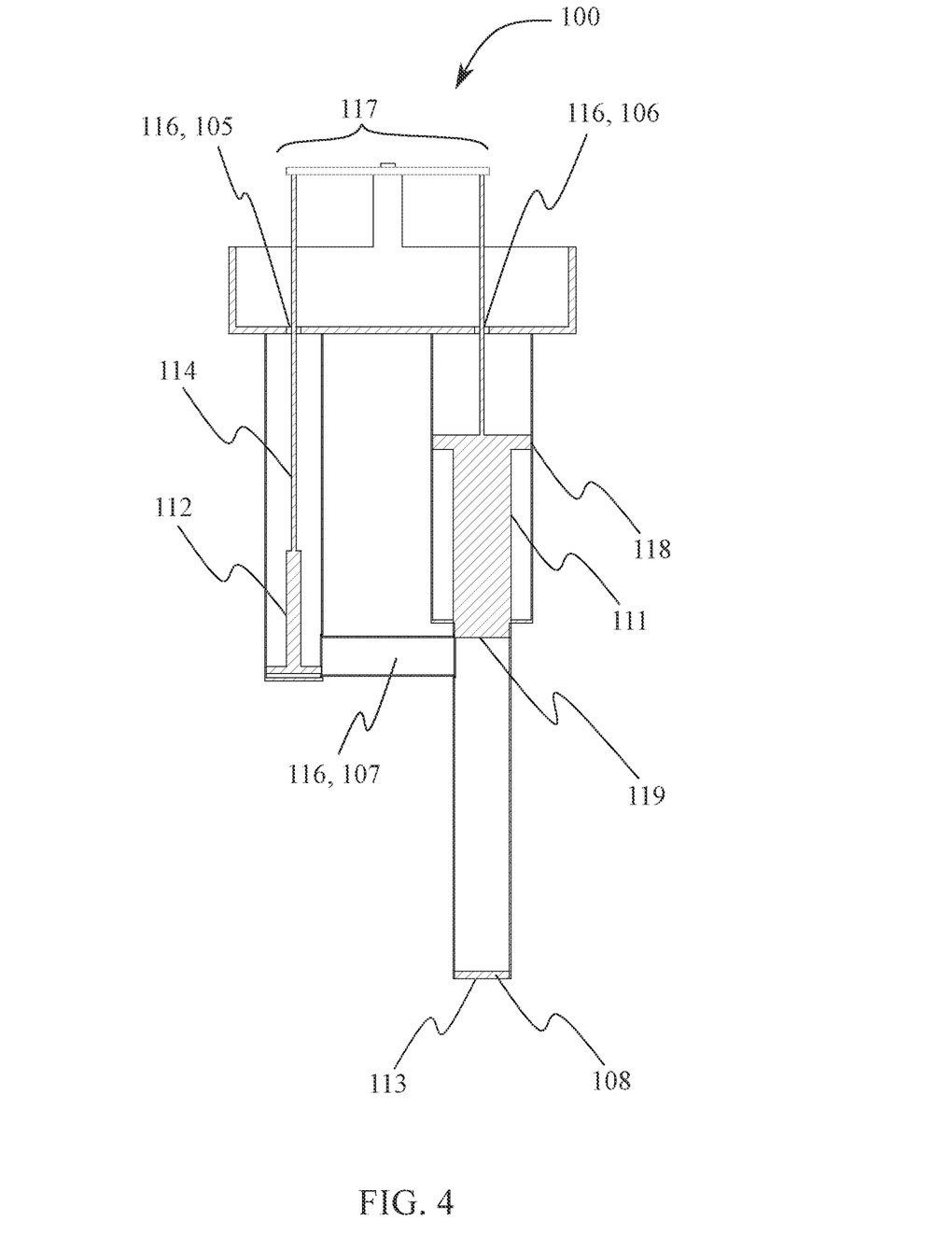
FIG. 4 is front section view of the piston subsystem of the present invention in accordance with at least one embodiment.
Figure 5:
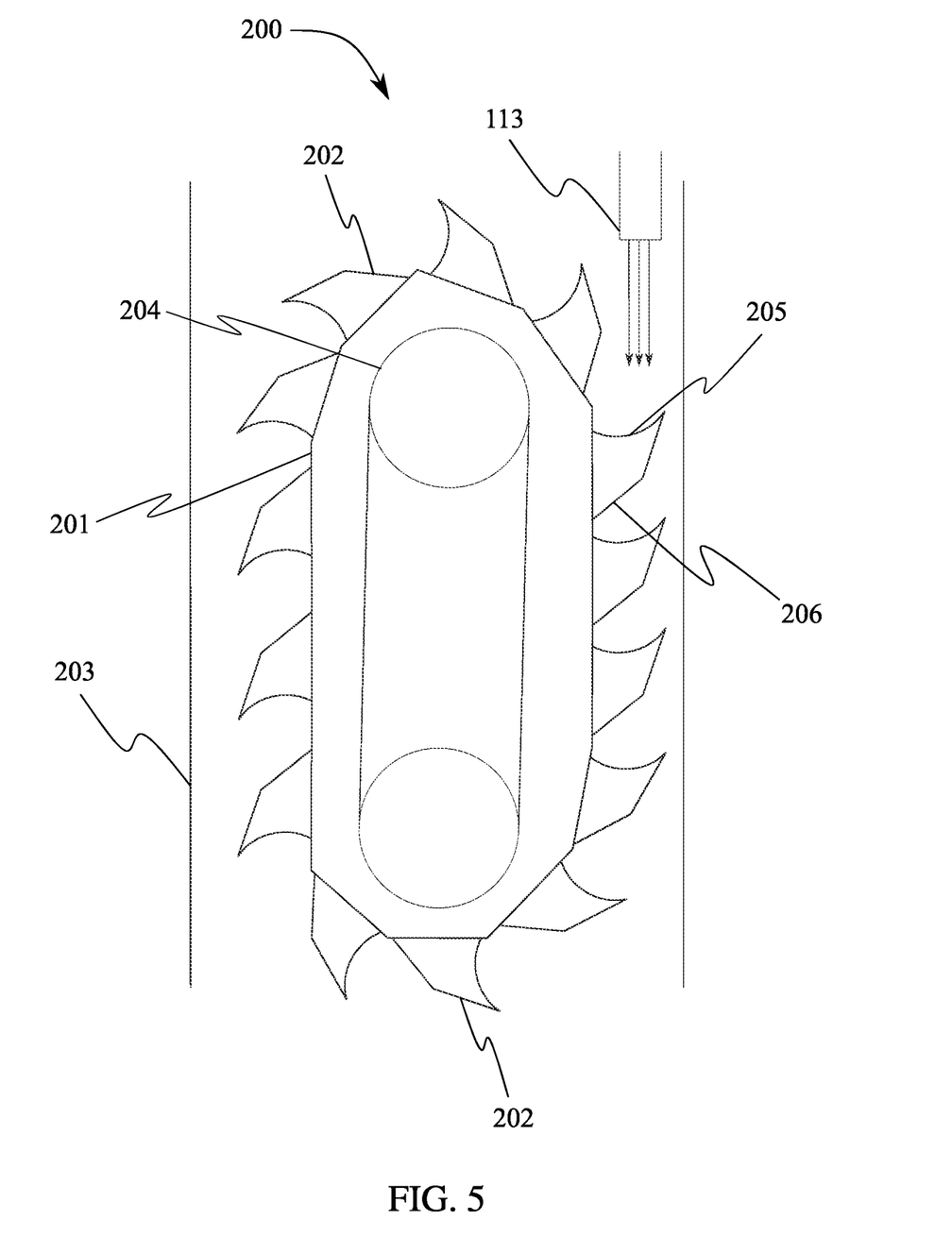
FIG. 5 is an illustration of the generator of the present invention in accordance with at least one embodiment.
Figure 6:
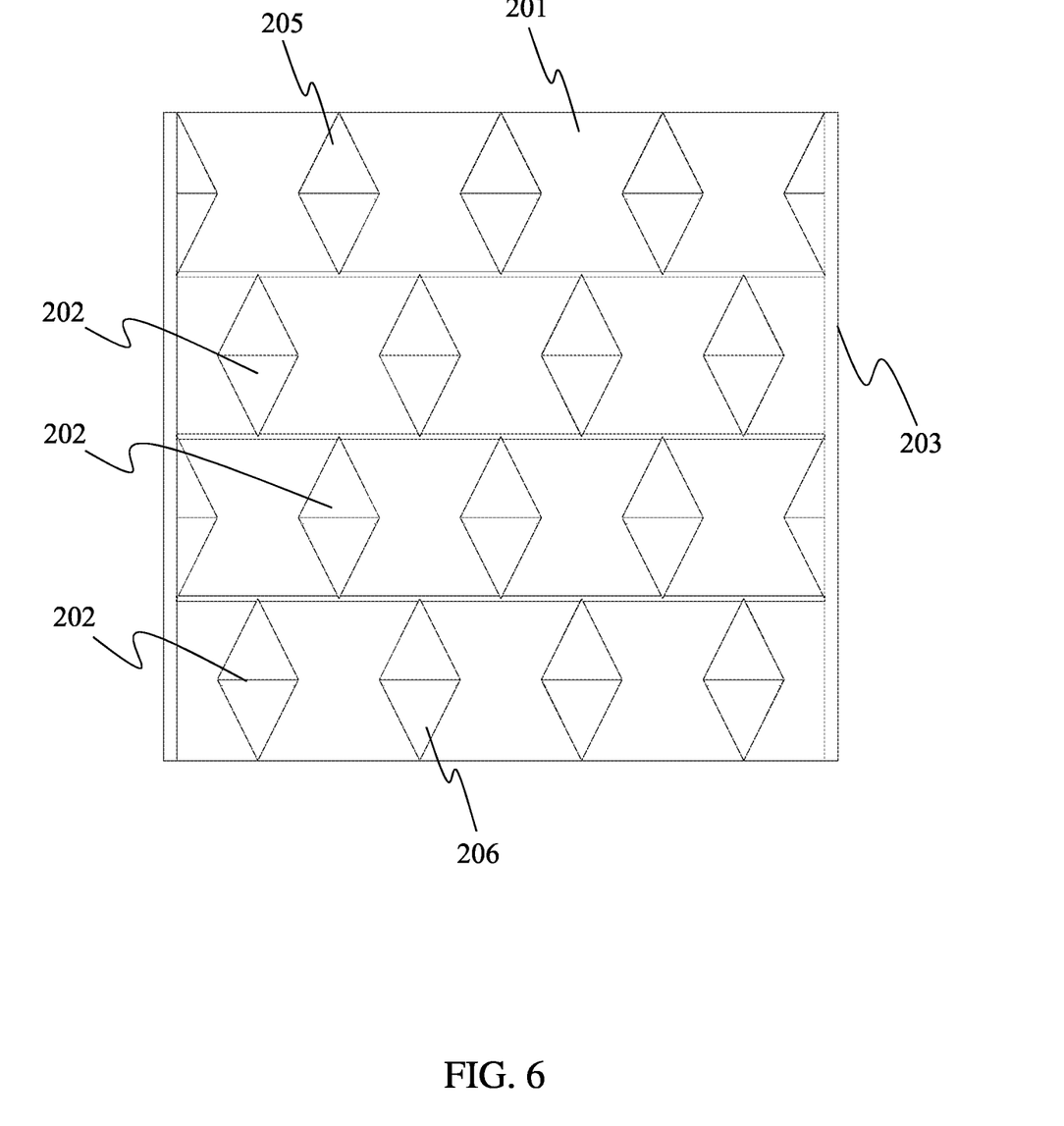
FIG. 6 is a front view of a section of the generator of the present invention in accordance with at least one embodiment.
Figure 7:
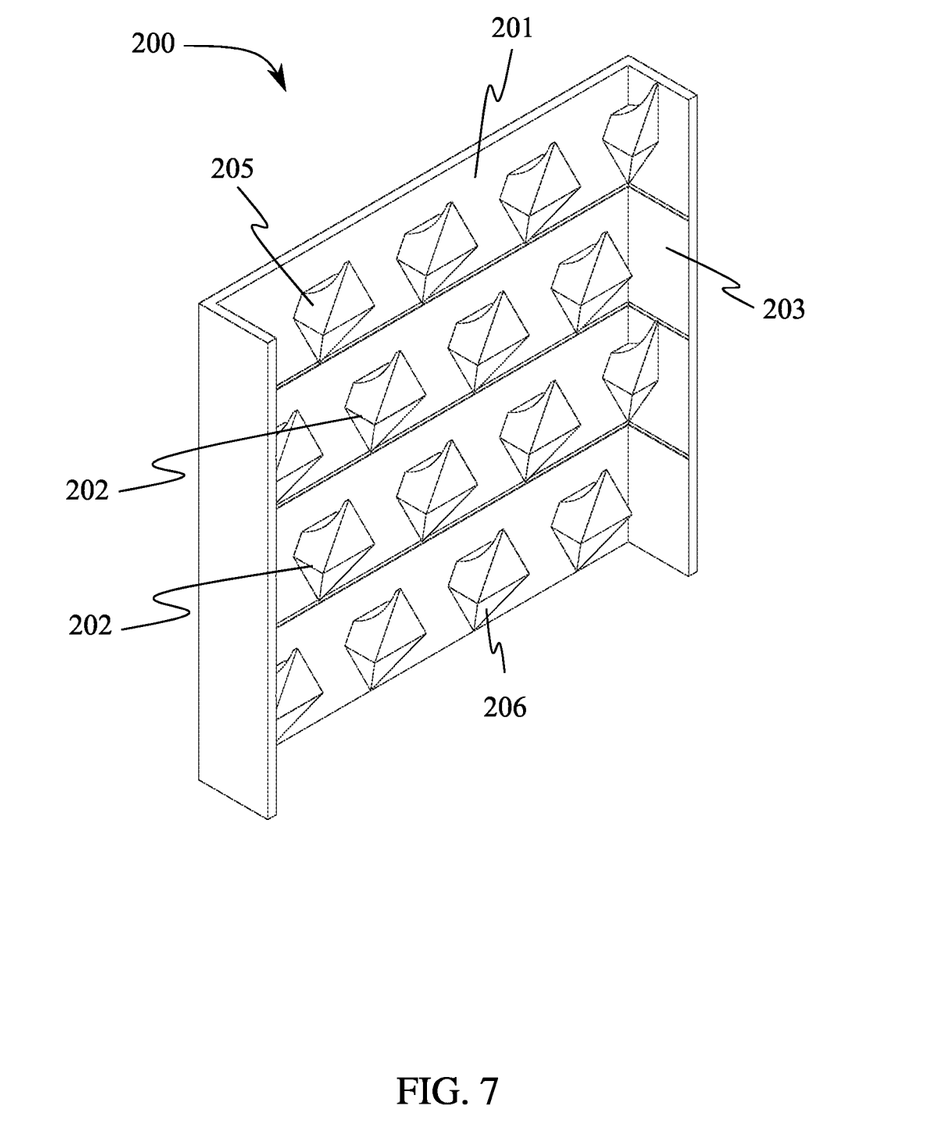
FIG. 7 is an isometric view of a section of the generator of the present invention in accordance with at least one embodiment.
Figure 8:
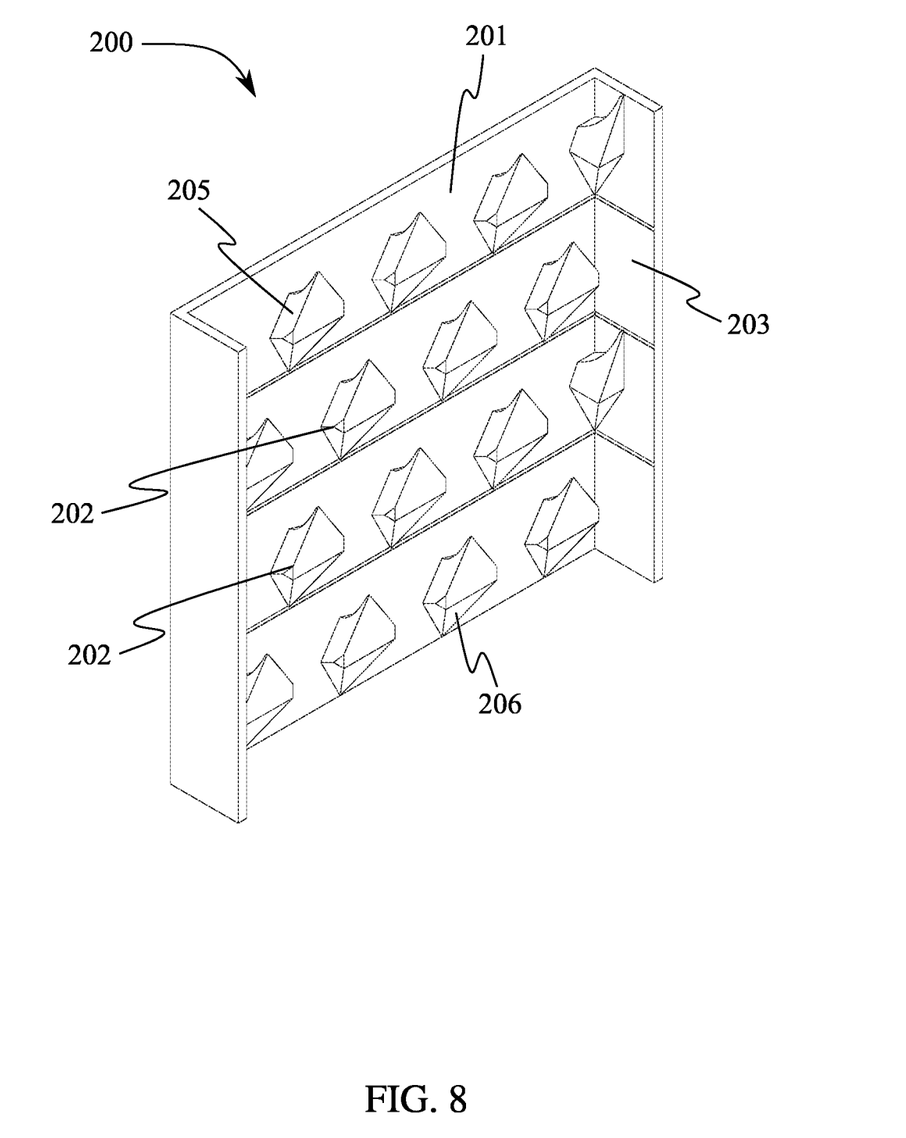
FIG. 8 is an isometric view of a section of the generator of the present invention in accordance with at least one embodiment.
Figure 9:
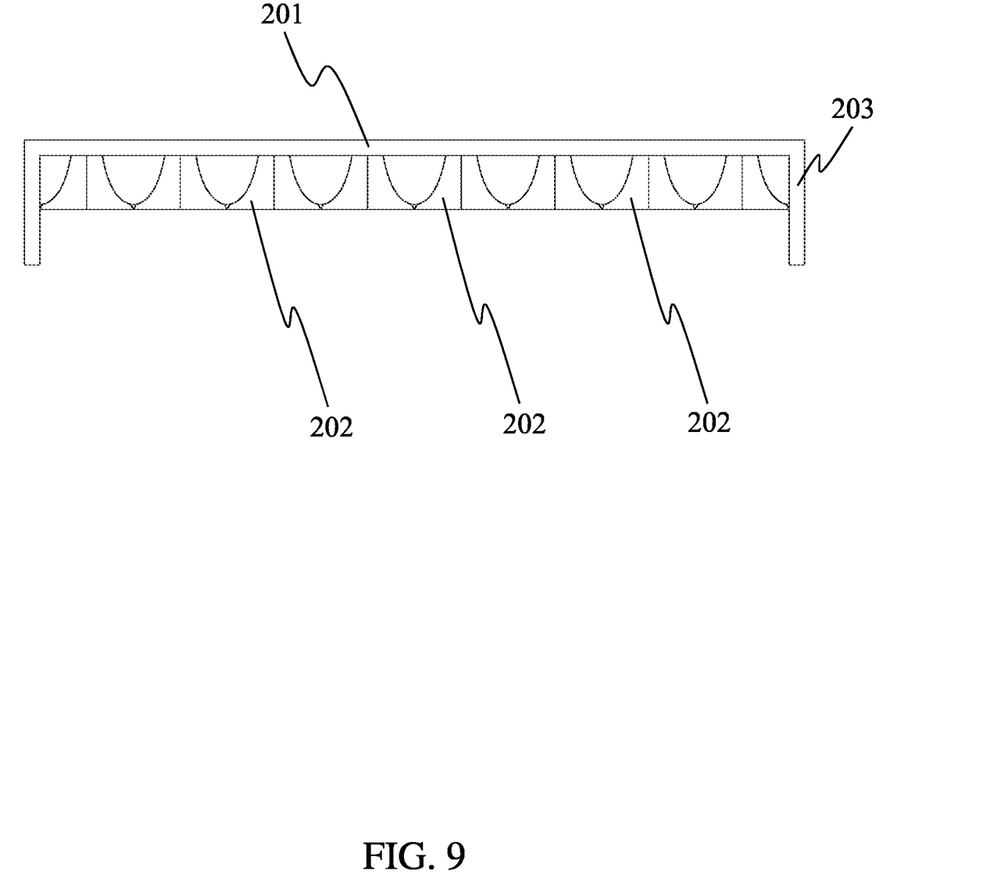
FIG. 9 is a top view of a section of the generator of the present invention in accordance with at least one embodiment.

As the liquid is ejected from the outlet 113, it is directed toward the plurality of teeth 202 on the belt 201 of the generator 200. The liquid may fill the plurality of teeth 202 and/or hit sides and edges of the plurality of teeth 202, moving the teeth 202 away from outlet 113 as they are acted upon, causing the belt 201 to rotate. The rotation of the belt 201 is then converted to electricity by the energy conversion mechanism 204. As the belt 201 rotates, the liquid in the plurality of teeth 202 is passed out of the generator 200 and empties into the collection basin 301. Once in the collection basin 301, the liquid can be cooled or warmed as needed by the temperature control mechanism 305. The liquid in the collection basin 301 may then be pumped back to the collection tank 101 by the first pump 303 through the return fluid line 302. The liquid remaining in the second pipe 103 may also be pumped back to the collection tank 101 by the second pump 304, resetting the system to its original orientation.

The collection tank 101 may be used to collect precipitation without making use of the piston sub-system 100 or the generator 200 to generate electricity. By closing the plurality of valves 116, precipitation may accumulate in the collection tank 101. This allows a user of the present invention to open the plurality of valves 116 at any desired time and generate energy as it is needed.

The system of the present invention has been described thus far as a single piston sub-system and a single generator 200. However, in some embodiments of the present invention, the system may comprise multiple piston sub-systems 100 and/or multiple generators 200 arranged in series. Further, while precipitation is relied upon for the liquid travelling though the system of the present invention, liquid may also be manually placed in the collection tank 101.

Although the invention has been explained in relation to its preferred configuration, it is to be understood that many other possible modifications and variations can be made without departing from the spirit and scope of the invention.

What is claimed is:

1. An electric generating precipitation collection system, comprising:
    a collection tank;
    a plurality of pipes;
    a plurality of valves;
    a piston assembly;
    an outlet;
    the plurality of pipes comprising a first pipe, a second pipe, and a third pipe;
    the plurality of valves comprising a first valve, a second valve, a third valve, and a fourth valve;
    the plurality of valves configured to selectively allow liquid to pass through;
    the piston assembly comprising a piston, a counter-piston, a connection cable, and a pulley mechanism;
    the first pipe connected to the collection tank by the first valve;
    the second pipe connected to the collection tank by the second valve;
    the third pipe connected to the second pipe, opposite the collection tank;
    the third pipe connected to the second pipe by the third valve;
    the outlet connected to the third pipe by the fourth valve;
    the piston arranged within the second pipe;
    the counter-piston arranged within the first pipe;
    the piston connected to the counter-piston by the connection cable; and
    the connection cable adjustably engaged with the pulley mechanism.

2. The electric generating precipitation collection system of claim 1, further comprising:
    the piston further comprising a head and a rod;
    the head of the piston oriented toward the collection tank;
    the rod of the piston oriented toward the third pipe; and
    the rod of the piston configured to slidingly engage with the third pipe.

3. The electric generating precipitation collection system of claim 2, further comprising:
    a locking mechanism;
    the locking mechanism connected to the pulley mechanism; and
    the locking mechanism configured to restrict movement of the connection cable relative to the pulley mechanism.

4. The electric generating precipitation collection system of claim 1, further comprising: a generator, the generator arranged adjacent to the outlet; and the generator configured to generate electricity from the flow of liquid out of the outlet.

5. The electric generating precipitation collection system of claim 4, further comprising:
    the generator comprising a belt, a plurality of teeth, and an energy conversion mechanism;
    the plurality of teeth arranged along the belt;
    the belt configured to rotate; and
    the energy conversion mechanism configured to generate electricity from the rotation of the belt.

6. The electric generating precipitation collection system of claim 5, further comprising:
    the plurality of teeth comprising an activating end and a supporting end;
    the activating end of each of the plurality of teeth arranged in the same direction along the belt; and
    the plurality of teeth configured to accept liquid on the activating end.

7. The electric generating precipitation collection system of claim 4, further comprising:
    a collection basin;
    a return fluid line;
    a first pump;
    the collection basin arranged adjacent to the generator;
    the collection basin configured to collect liquid from the generator;
    the return fluid line liquidly connecting the collection basin to the collection tank; and
    the first pump configured to pump liquid from the collection basin to the collection tank through the return fluid line.

8. The electric generating precipitation collection system of claim 7, further comprising:
    a temperature control mechanism;
    a supplemental electricity source;
    the temperature control mechanism configured to adjust the temperature of liquid in the collection basin; and
    the supplemental electricity source configured to power the first pump and the temperature control mechanism.

9. The electric generating precipitation collection system of claim 8, further comprising:

the supplemental electricity source being at least one of a solar panel, a wind turbine, and a battery.

10. The electric generating precipitation collection mechanism of claim 1, further comprising:
a second pump; and
the second pump configured to pump liquid from the second pipe to the collection tank.

11. An electric generating precipitation collection system, comprising:
a collection tank;
a plurality of pipes;
a plurality of valves;
a piston assembly;
an outlet;
a generator;
a collection basin;
the plurality of pipes and the plurality of valves connecting the collection tank to the outlet;
the plurality of valves configured to selectively allow liquid to pass through;
the piston assembly configured to pressurize liquid within the plurality of pipes;
the generator arranged adjacent to the outlet;
the generator configured to generate electricity from the flow of liquid out of the outlet;
the collection basin arranged adjacent to the generator;
the collection basin configured to collect liquid from the generator;
the plurality of pipes comprising a first pipe, a second pipe, and a third pipe;
the plurality of valves comprising a first valve, a second valve, a third valve, and a fourth valve;
the first pipe connected to the collection tank by the first valve;
the second pipe connected to the collection tank by the second valve;
the third pipe connected to the second pipe, opposite the collection tank;
the third pipe connected to the second pipe by the third valve; and
the outlet connected to the third pipe by the fourth valve.

12. The electric generating precipitation collection mechanism of claim 11, further comprising:
the piston assembly comprising a piston, a counter-piston, a connection cable, and a pulley mechanism;
a locking mechanism;
the piston arranged within the second pipe;
the counter-piston arranged within the first pipe;
the piston connected to the counter-piston by the connection cable;
the connection cable adjustably engaged with the pulley mechanism;
the locking mechanism connected to the pulley mechanism; and
the locking mechanism configured to restrict movement of the connection cable relative to the pulley mechanism.

13. The electric generating precipitation collection mechanism of claim 12, further comprising:
the piston further comprising a head and a rod;
the head of the piston oriented toward the collection tank;
the rod of the piston oriented toward the third pipe; and
the rod of the piston configured to slidingly engage with the third pipe.

14. The electric generating precipitation collection mechanism of claim 11, further comprising:
a second pump; and
the second pump configured to pump liquid from the second pipe to the collection tank.

15. An electric generating precipitation collection mechanism, comprising:
a collection tank;
a plurality of pipes;
a plurality of valves;
a piston assembly;
an outlet;
a generator;
a collection basin;
a return fluid line;
a first pump;
a temperature control mechanism;
a supplemental electricity source;
the plurality of pipes and the plurality of valves connecting the collection tank to the outlet;
the plurality of valves configured to selectively allow liquid to pass through;
the piston assembly configured to pressurize liquid within the plurality of pipes;
the generator arranged adjacent to the outlet;
the generator configured to generate electricity from the flow of liquid out of the outlet;
the collection basin arranged adjacent to the generator;
the collection basin configured to collect liquid from the generator
the return fluid line liquidly connecting the collection basin to the collection tank;
the first pump configured to pump liquid from the collection basin to the collection tank through the return fluid line;
the temperature control mechanism configured to adjust the temperature of liquid in the collection basin; and
the supplemental electricity source configured to power the first pump and the temperature control mechanism.

16. The electric generating precipitation collection system of claim 15, further comprising:
the supplemental electricity source being at least one of a solar panel, a wind turbine, and a battery.

* * * * *